Patented Sept. 29, 1953

2,653,924

UNITED STATES PATENT OFFICE 2,653,924

VULCANIZATION ACCELERATORS

John F. Olin, Grosse Ile, Mich., assignor to Sharples Chemicals Inc., a corporation of Delaware No Drawing. Application December 23, 1950, Serial No. 202,571

10 Claims. (Cl. 260—94.8)

The present invention pertains to the vulcanization of rubber, natural or synthetic. It is particularly concerned with new and improved solid compositions for accelerating such vulcanization, and with processes for manufacturing said compositions.

The art of vulcanizing rubber is of course very old, and the use of chemicals to modify vulcanization in various desired ways is likewise old. The use of such substances, commonly called vulcanization accelerators, has introduced certain complexities and problems into the art, and many of these problems have heretofore remained either unsolved or only partially solved.

For example, the operations involved in the manufacture and packaging of accelerators which are solid at ordinary temperatures frequently give rise to dusting problems, due to the flying about of particles of such chemicals in the atmosphere. A dusty condition of this kind is very objectionable for at least two reasons, one of which is the irretrievable loss of considerable amounts of expensive accelerator. A second and even more important reason resides in the menace to the health and comfort of operators who must perforce work in the polluted atmosphere. This is quite obvious when it is realized that most accelerators can produce dermatoses and/or other toxic conditions to some degree, and that certain accelerators are highly toxic.

The same remarks apply to the use of the same solid accelerators in rubber compounding, where numerous manipulations are necessary, such as removal of materials from packages, weighing the materials, and incorporating them into rubber formulations. Thus there is ample opportunity for the escape of dust into the atmosphere of the mill room, with attendant loss of accelerator and hazards to the health of workmen.

A number of procedures have been proposed for reducing the dusting tendencies of solid accelerators. Among such procedures there may be mentioned the compression or nodulizing of the accelerators into pellets and the like, and also the treatment of the accelerators with various anti-dusting agents, such for example as hydrocarbon oils, higher fatty acids, casein, gelatin, resinous materials, etc. Such procedures have in general tended to alleviate dusting, but have not been entirely satisfactory.

Another difficulty is the poor mechanical stability which is characteristic of many solid accelerators. For example, many accelerators, although they are free-flowing powders initially, become caked upon storage; this is often true in the case of powdery materials, including those which have been treated for alleviation of dustiness. Even those accelerators which have been compressed or nodulized into various shapes, with or without anti-dusting additives, usually have unsatisfactory mechanical stability. Upon being agitated, such as occurs in ordinary handling and shipping, the large particles break up appreciably and objectionable amounts of small, dust-like particles are formed.

Many solid accelerators tend to stick to the mill rolls, and in some cases this is quite a serious problem. In those instances where the sticking tendency is marked, it is possible that the mixing of the accelerator into the rubber formulation will not be uniform, with consequent over-vulcanization of some areas. This undesirable condition is particularly true for rubber batches mixed in short time cycles. Proposals for the solution of this problem have been only partially successful.

Still another problem which frequently is quite serious lies in the difficulty with which many solid accelerators become incorporated into (i. e., dispersed in) rubber formulations. The particle size of some commercial accelerators undoubtedly contributes to this difficulty in some instances. In many instances, however, it seems as if the formulation being prepared tends to repel the accelerator to some extent, so that considerable quantities of the latter escape as dust into the air and/or fall through the mill and into the mill pan. Even though the accelerator may ultimately disperse uniformly in the formulation and thus serve its intended purpose therein, it is obvious that economy suffers, because of an unduly long time cycle with consequent high labor and power costs, and also because of loss of accelerator.

This general problem has been so acute that many procedures for its solution have been suggested. Some of the suggested procedures are devoid of substantial merit, while others have afforded no more than partial solution of the problem.

Generally speaking, the proposals found in the prior art for the solution of problems such as those problems discussed above, have failed in one or more particulars. Some of the proposals afford a partial solution to one or more of such problems, but I am not aware of any proposal which gives a reasonable, simultaneous solution to all such problems.

My accelerator compositions, on the other hand, afford an excellent solution in that: (1)

dusting is substantially eliminated, both during the manufacture of the compositions and during their use in the rubber industry; (2) they have excellent mechanical stability, such as in handling and shipping; (3) in substantially all instances, they have no appreciable tendency to stick to mill rolls; (4) they disperse in rubber formulations with superior efficiency; and (5) their particle sizes are acceptably small. It is of course recognized that other compositions might be found which possess any one or possibly any two or three or even any four of the attributes mentioned above. However, a composition must possess all five attributes, if it is to afford improved economy and technical effectiveness.

I have discovered that compositions containing one or more salts of N-disubstituted dithiocarbamic acids which are normally solid at ordinary temperatures, and which possess the property of accelerating the vulcanization of rubber, in intimate admixture with polybutene and/or hydrogenated polybutene, are highly effective when used as vulcanization accelerators, and that the outstanding advantages discussed hereinabove accrue from the use of such compositions in the rubber art. Such solid salts, especially metal salts, of substituted dithiocarbamic acids are particularly suitable as ingredients of such compositions.

The term "polybutene" is meant to designate any synthetic polymer or copolymer derived by the catalytic polymerization of isobutene, or a mixture of isobutene with one or more of butene-1 and butene-2, and having an average molecular weight falling in the range of from about 500 to about 5000, a preferred range being from about 750 to about 3000, with an average molecular weight between approximately 1000 to 1500 being particularly satisfactory. The presence of polymers having molecular weights somewhat less than 500 or somewhat more than 5000 is contemplated within the broad scope of the invention, but I have found that in general the use of such polymers in major amount is not conducive to realizing the maximum advantages of the invention. The same considerations apply to hydrogenated polybutene, which is produced by the mere hydrogenation of polybutene by any means known in the art.

For convenience, the following description will be made in connection with polybutene, it being understood that it is equally applicable to hydrogenated polybutene.

The polybutene contained in my improved accelerators does not detract from the accelerating properties of the active ingredients contained therein. On the contrary, said polybutene acts as a dispersant which improves the ease and speed of incorporation of the accelerator into the rubber formulation, although the polybutene itself is not an accelerator.

The relative proportions of solid accelerator and polybutene contained in my compositions may vary over quite a wide range, such as from 0.5% up to 20%, e. g., up to 15% by weight of solid accelerator. However, I have found that from about 1% to about 10% of polybutene, based on the weight of the solid accelerator, constitutes a preferred concentration range, and more particularly from about 3% to about 6%.

The invention broadly contemplates compositions (and methods of preparing the same) containing polybutene in thorough, intimate admixture with any one or more accelerators which are salts of N-disubstituted dithiocarbamic acids, and which in the form employed are solid under ordinary temperature conditions, e. g. below about 30° C. or higher, such as below about 40° C. or 50° C.

It is pointed out that the polybutenes are characterized by a high degree of chemical stability in the presence of said accelerators. Thus it has been found in practice that they exhibit substantially no tendency to become vulcanized, either slowly, as in prolonged storage of my compositions, or rapidly, as in the use of said compositions in preparing rubber formulations on rubber mills. Their low degree of unsaturation, which amounts to but one olefinic linkage per molecule of polybutene (none in the case of hydrogenated polybutene), probably is responsible for this desirable inertness.

Substances other than polybutene and accelerator may be included in the compositions, if desired, particularly materials commonly employed in the rubber art, such as antioxidants, inert materials (e. g., clay and carbon black), zinc oxide, sulfur, etc. The inclusion of such materials in the compositions falls within the purview of the invention.

Examples of salts of substituted dithiocarbamic acids which are employed as active ingredients in my compositions are zinc dimethyldithiocarbamate, lead dimethyldithiocarbamate, bismuth dimethyldithiocarbamate, sodium dimethyldithiocarbamate, potassium diethyldithiocarbamate, zinc diethyldithiocarbamate, cupric diethyldithiocarbamate, selenium diethyldithiocarbamate, tellurium diethyldithiocarbamate, zinc dibutyldithiocarbamate, zinc pentamethylenedithiocarbamate, sodium diethyldithiocarbamate, potassium dimethyldithiocarbamate, diethylammonium diethyldithiocarbamate, cadmium diethyldithiocarbamate, cadmium dimethyldithiocarbamate, selenium dimethyldithiocarbamate, tellurium dimethyldithiocarbamate, cupric dimethyldithiocarbamate, zinc diphenyldithiocarbamate, zinc ethylphenyldithiocarbamate, zinc dibenzyldithiocarbamate, zinc difurfuryldithiocarbamate, and zinc bis(tetrahydrofurfuryl) dithiocarbamate. However, it is to be understood that the invention is not limited to those compounds which are specifically mentioned.

It will be noted that the aforesaid examples include compounds which are known to be exceptionally toxic, particularly the salts of selenium, tellurium, copper, lead, cadmium, and bismuth. This invention is particularly advantageous in providing such highly toxic materials in the form of substantially dustless compositions.

The compositions of this invention are highly suitable for use in all types of rubber compounding, such as in the manufacture of tires, inner tubes, mechanical goods, wire and cable insulation, footwear, drug sundries, cements, dry rubber sponge, etc. They are likewise highly suitable for incorporation into water dispersions of the kind employed in latex applications, such as in foam or dipped goods operations.

Said compositions may be produced in either of two solid forms, namely, as finely divided, free-flowing, non-dusting powders, or as mechanically stable, shaped agglomerates in which the discrete particles of the active ingredients are quite fine.

Both forms possess distinct advantages (such as those mentioned above) as compared to the corresponding accelerators, untreated or in admixture with additives which have been hitherto employed. However, I somewhat prefer the shaped, agglomerated form, such as the extruded product which is described below.

Solid accelerators (e. g., in the finely divided form in which they are ordinarily employed in rubber compounding) may be admixed with the polybutene in any desired manner, numerous variations of admixing procedures being possible, as will be seen.

The accelerator may be dry, or it may be contained in a moist mass such as a filter cake, or in a fluid suspension. It is preferred that the liquid present in the filter cake or suspension be low in electrolyte content; otherwise the polybutene sometimes may not admix to best advantage with the accelerator. Instead, some of the polybutene may tend to coat the walls of the vessel and to remain in part as a separate, oily phase.

The polybutene may be used per se, or as an emulsion, such as an aqueous emulsion comprising polybutene dispersed in water with the aid of a small amount of a dispersing agent, such for example as triethanolamine oleate.

Thus it will be seen that polybutene per se may be admixed with dry accelerators, or with accelerators containing appreciable amounts of aqueous or non-aqueous liquid. Likewise, emulsified polybutene may be admixed with dry accelerators or with accelerators containing liquid. I find that it is not always necessary to break such emulsions, upon or after such admixing, in order to deposit the polybutene on the accelerator particles although this is preferred and may be effected by any means, such as by acidification with water soluble acids (e. g., sulfuric, hydrochloric, acetic, etc.), or by other means.

While it is possible to prepare powdery accelerator-polybutene compositions by any of the modifications listed above, a good procedure is by mechanically admixing the dry accelerator with polybutene per se. Any means of intimately mixing a relatively large amount of a dry powder with a relatively small amount of a viscous liquid may be employed, such as by kneading, rolling, mastication, mulling, or otherwise. Mixing devices capable of incorporating the viscous liquid (i. e., polybutene) into the powder through the action of grinding or shearing surfaces are suitable.

Powdery forms may also be prepared by adding polybutene, per se or emulsified, to agitated aqueous suspensions of accelerators. The suspending medium, for example, may be the medium employed in the chemical preparation of the accelerator, and/or water added to the dry accelerator to form a slurry, or otherwise. As has been pointed out, the presence of substantial quantities of electrolytes is sometimes not preferred. This difficulty, however, may be minimized by the use of efficient agitation. The slurry containing the polybutene-treated accelerator may then be filtered, washed, aired, dried, and pulverized by any convenient means.

Various procedures are available for preparing agglomerated forms of my compositions. Said agglomerated forms may be prepared by extrusion, fin drum flaking, low pressure molding, or otherwise.

Thus an excellent, highly satisfactory procedure consists of extruding an accelerator-polybutene-water dough or paste. The consistency of the paste may be varied by the amount of water or other liquid present, optimum consistency depending upon the particular device used for extrusion and/or the particular accelerator employed. A satisfactory method of deriving such a paste is by controlling the amount of water left in the filter cake obtained by filtration of slurries as described above. The amount of water in the filter cake may be controlled by the degree of air-blowing in the filter before discharging the cake.

A paste suitable for extrusion may also be prepared by intensively mixing polybutene with the dry accelerator in the presence of sufficient water to confer the desired consistency to the finished paste.

Pastes prepared in the described manner may be extruded into agglomerates by means of any suitable extrusion device. Among such devices there may be mentioned extruders in which the paste is moved by the action of an auger and forced through a die plate having multiple openings of any desired design; extruders in which the paste is fed into a chamber where a revolving wheel traveling on the circumference of a circular die plate forces the paste through the openings thereof; and granulators such as Stokes granulators, in which the paste is dropped onto a curved screen over which a bar oscillates and thus forces the paste through the screen.

The extrudate may then be dried by any convenient means, and the dried product may be screened if desired in order to remove such small amount of residual powder as may be present. Said powder may of course be recycled in subsequent batches.

It is noteworthy that the moist extrudates may be dried more quickly than bulky masses (such as filter cakes) of the corresponding untreated accelerators containing comparable amounts of water.

The preparation of my compositions is illustrated by the following examples. Therefore, it is not intended that the invention shall be limited to the specific accelerators, polybutenes, and/or admixing procedures described therein.

In the examples, the symbol PB stands for commercial polybutene and the number immediately after the symbol indicates the average molecular weight of said polybutene.

EXAMPLE 1

PB1100 (22 g.) is added to 528 g. of zinc dimethyldithiocarbamate in a 1-gallon working-capacity, kneading-type mixer, equipped with sigma-type blades. The mixture is kneaded for 30 minutes at ordinary temperature.

The product as discharged from the mixer is a white, non-dusty, free-flowing powder.

EXAMPLE 2

By the procedure of Example 1, 22 g. of PB1500 is admixed with 528 g. of the same accelerator, to provide a product of the same appearance.

EXAMPLE 3

By the procedure of Example 1, 22 g. of PB3000 is admixed with 528 g. of the same accelerator, to provide a product of the same appearance.

EXAMPLE 4

The procedure of Example 1 is followed to admix 30.3 g. of PB1100 with 475 g. of zinc diethyldithiocarbamate.

The appearance of the product is substantially the same as that of the product obtained in Example 1.

EXAMPLE 5

By the procedure of Example 1, zinc dimethyldithiocarbamate is admixed with PB780. The resulting non-dusty, free-flowing powder is white.

EXAMPLE 6

533 pounds of zinc dimethyldithiocarbamate water-washed filter cake containing about 25% water was added to 200 gallons of water contained in a stainless steel vessel equipped with a high speed stirrer (Cowles mixer). To the resulting agitated suspension was added 14 pounds of PB1100 over a period of 15 minutes, after which stirring was continued for 1 hour. The slurry was then pumped to a filter press, and the resulting filter cake was blown with air for 10 seconds, to provide a paste having a consistency suitable for extrusion through a Stokes granulator having a 7-mesh screen. During extrusion, the extrudate was discharged in the form of rough prisms about ¼ inch to ½ inch in length.

The extrudate dropped to trays and was dried for 6 hours at 60° C. The dried extrudate containing less than 0.3% moisture was passed over a 10-mesh vibrating screen to remove a small amount of fines. The screening operation also smooths the rough prisms, thereby improving the appearance and mechanical stability of the product.

EXAMPLE 7

The procedure employed was a modification of that used in Example 6. In the present instance, the respective dry, powdery commercial accelerators were slurried with water and polybutene was added to the slurries, the remaining steps being the same as in Example 6. The operating variables and the quantities of accelerators, water, and polybutene were:

|  | Zinc diethyldithiocarbamate | Zinc dibutyldithiocarbamate | Selenium diethyldithiocarbamate |
|---|---|---|---|
| Water _____ gal__ | 200 | 175 | 175 |
| Accelerator _____ lb__ | 500 | ¹ 320 | 600 |
| PB1100 _____ lb__ | 17 | 17 | 22 |
| Air blowing _____ sec__ | 60 | 20 | 5 |
| Drying temperature __°C__ | 80 | 40 | 40 |
| Drying time _____ hr__ | 7 | 10 | 12 |

¹ A wetting agent (4 oz.) was added to repress foam.

EXAMPLE 8

60.3 g. of 58% PB1100 aqueous emulsion is added to 665 g. of zinc dimethyldithiocarbamate in a 1-gallon working-capacity kneading-type mixer equipped with sigma-type blades. While the mixture is being kneaded, 590 cc. of water is gradually added, and kneading is continued for about 15 minutes in order to obtain a paste of proper consistency for extrusion.

The paste is extruded through a roller type extruder and the extrudate dropped onto trays for drying. After being dried, the product is screened through a 10 mesh sieve to remove a small amount of fines. The final product is of excellent uniform appearance and mechanical stability.

EXAMPLE 9

35 g. of PB1500 is added to 665 g. of zinc dimethyldithiocarbamate in the same mixer as in Example 8. Kneading of this mixture is commenced, and 515 cc. of water is gradually added. Kneading is then continued for about 15 minutes to obtain a paste of the desired consistency.

The extrusion, drying, and screening procedures of Example 8 are followed, to provide a uniform product of excellent appearance and mechanical stability.

EXAMPLE 10

The procedure of Example 9 is followed, except that PB3000 is employed. The product is mechanically stable and of excellent appearance.

Determination of the dust index affords an excellent means for evaluating the dusting characteristics of accelerators or of compositions containing accelerators.

A suitable apparatus for determining this index comprises a 34 inch length of 50 mm. glass tubing open at one end, the other end being drawn to a V and having a U-tube of 7 mm. glass tubing sealed thereto. The large tube is provided with an opening which is 7 inches from this junction, and which is large enough to permit the horizontal insertion of a microscope slide when the apparatus is in operating position. This position is vertical with the open end at the top.

The U-tube is connected to a compressed air line in which the pressure is 3 pounds per square inch. A one gram sample is placed in the V-shaped part of the tube. A cloth held by a rubber band is placed over the upper end of the apparatus and the slit for the microscope slide is covered to prevent loss of sample during agitation. The sample is blown upward into the 50 mm. section of the apparatus by passing compressed air in through the U-tube for 30 seconds. The air is then shut off, and 15 seconds later a microscope slide is placed in the slit and allowed to remain for 60 seconds. The number of dust particles per square millimeter on the slide is determined microscopically. This value is called the dust index. A low index denotes a product of good non-dusting properties, while a high index denotes dustiness.

Table 1 shows the dust indexes of representative accelerators, as determined by the above method. The name of a compound without further designation means that the accelerator was a commercial grade product in the form of a powder to which nothing had been added. The symbol 5% PB1100-e indicates an extruded composition comprising a commercial grade accelerator in admixture with 5%, based on the weight of the accelerator, of polybutene having an average molecular weight of 1100.

*Table 1*

| Dithiocarbamates | Dust Index |
|---|---|
| Zinc dimethyldithiocarbamate | <2,000 |
| Zinc dimethyldithiocarbamate, 5% PB1100-e | 5 |
| Zinc diethyldithiocarbamate | 50 |
| Zinc diethyldithiocarbamate, 5% PB1100-e | 7 |
| Zinc dibutyldithiocarbamate | 360 |
| Zinc dibutyldithiocarbamate, 5% PB1100-e | 10 |
| Selenium diethyldithiocarbamate | 35 |
| Selenium diethyldithiocarbamate, 5% PB1100-e | 1 |

The dispersing properties of an accelerator are reflected by its milling characteristics, as well as by the quality of the resulting vulcanizate.

The milling characteristics of representative accelerator-polybutene compositions were compared with those of the corresponding untreated accelerators, using a butadiene-styrene copolymer master batch which contains 50 parts of easy-processing channel black per 100 parts of copolymer, and which is designated by Rubber Reserve Corporation as GR–S Black–1. The particular accelerator formulation employed was:

GR–S Black–1 _____ 200
Accelerator _____ 50

Total _____ 250

The compounding of the accelerator formulation was as follows. Two hundred grams of synthetic rubber-carbon black master batch was banded on 6" (diameter) by 12" (length) laboratory mill rolls, with the distance between the mill guides adjusted to 6" and the distances between the mill rolls adjusted to 0.06". Cold water was circulated through the mill rolls. The accelerator (50 g.) which was to be incorporated into the formulation was added to the moving rubber mixture. The time required for all the accelerator to dissolve or disperse into the rubber mix was noted; this is the incorporation time. In separate experiments, the respective accelerators were thus incorporated. The observations made in these experiments are summarized in Table 2.

For convenience, this table is also made to show the approximate average size of the ultimate particles of a number of accelerators before incorporation into the accelerator formulation. These values were determined by microscopic examination. In the case of the extrudates, it was necessary to break the agglomerates into their component discrete particles by means of gentle pressure, prior to examination.

Table 2

| Dithiocarbamates | Approximate average particle size in microns | Incorporation time, seconds |
|---|---|---|
| Zinc dimethyldithiocarbamate | 2.2 | 115 |
| Zinc dimethyldithiocarbamate, 5% PB1100-e | 0.9 | 80 |
| Zinc diethyldithiocarbamate | 2.4 | 100 |
| Zinc diethyldithiocarbamate, 5% PB1100-e | 0.4 | 75 |
| Zinc dibutyldithiocarbamate | 4.0 | 125 |
| Zinc dibutyldithiocarbamate, 5% PB1100-e | 2.9 | 80 |
| Selenium diethyldithiocarbamate | 3.5 | 175 |
| Selenium diethyldithiocarbamate, 5% PB1100-e | 3.0 | 85 |

Thus the data of Table 2 cogently demonstrate that in all instances the incorporation (i. e., dispersion) of accelerator into a rubber formulation is outstandingly hastened by polybutene, because of the dispersing properties of the latter.

The procedure which has just been described provides rubber masses in which accelerator concentrations are quite high. Such masses may themselves be employed advantageously as accelerator master batches, which may be compounded with further amounts of rubber and such other compounding ingredients as may be desired.

Physical tests were made on vulcanizates thus prepared, and it was found that in the case of any given accelerator, there was no substantial difference in the quality of the vulcanizates, regardless of whether the particular accelerator employed was in untreated, powder form or in admixture with polybutene. In other words, the polybutene permits shorter time cycles in rubber compounding, without detriment to the quality of vulcanizates obtained therefrom.

Alternatively, my compositions may be employed as direct compounding ingredients in the manufacture of rubber formulations. The experiments described below illustrate the value of my compositions when employed in such rubber formulations. In all cases the accelerator-polybutene admixtures were incorporated into the formulations much more rapidly than the corresponding untreated accelerators; and the quality of the resulting vulcanizates was substantially equal. Furthermore, use of the untreated accelerators caused the flying about of obnoxious dust during the compounding operations, but this was not the case when my accelerator compositions were employed.

A master batch having the following composition was prepared:

| | |
|---|---|
| Smoked sheet (well broken down) | 100 |
| Peptizing agent | 1 |
| Antioxidant | 1 |
| Stearic acid | 1 |
| Light process oil | 2 |
| Zinc oxide | 10 |
| Whiting, ground | 52 |
| Soft clay | 30 |
| EPC black | 4 |
| Tetramethylthiuram disulfide | 2 |
| Total | 203 |

This is a very soft, natural rubber formulation such as is suitable for wire insulation. It may be pointed out that difficulty is at times encountered in obtaining satisfactory dispersion of accelerators in such a formulation, particularly at the low temperature conditions employed in the milling operations of the following experiments. Hence such experiments provide an especially severe test of accelerator performance.

By way of example, for evaluating rate of accelerator incorporation, 200 g. of untreated zinc dimethyldithiocarbamate was added to 1000 g. of the preceding master batch being milled at cool processing temperatures (70–75° F.) on a 6" by 12" laboratory rubber mill with guides set 6" apart, and with the distance between rolls being set at ¼". The incorporation time of the accelerator was 125 seconds. A similar mix was made in which the accelerator was zinc dimethyldithiocarbamate 5% PB1100–e; the incorporation time was 105 seconds.

In another experiment, a vulcanizate was prepared by milling 203 g. of the aforesaid smoked sheet master batch with 4 g. of untreated zinc dimethyldithiocarbamate, employing the same mill and the same processing temperatures as noted above, and another vulcanizate was similarly prepared from 203 g. of said smoked sheet master batch and 4 g. of zinc dimethyldithiocarbamate 5% PB1100–e. The original physical properties of the vulcanizates are shown in Table 3, from which it can be seen that the vulcanizates were substantially equal in quality.

Table 3.—Original properties

VULCANIZATE WITH ZINC DIMETHYLDITHIO-CARBAMATE

| Mins. cure @ 320° F. | Modulus 300% | Tensile strength | Elongation | Hardness |
|---|---|---|---|---|
| 3 | 330 | 1,480 | 540 | 38 |
| 5 | 400 | 1,420 | 520 | 39 |
| 10 | 400 | 1,470 | 510 | 40 |
| 15 | 460 | 1,330 | 490 | 40 |

VULCANIZATE WITH ZINC DIMETHYLDITHIO-CARBAMATE 5% PB1100–e

| Mins. cure @ 320° F. | Modulus 300% | Tensile strength | Elongation | Hardness |
|---|---|---|---|---|
| 3 | 450 | 1,460 | 540 | 37 |
| 5 | 500 | 1,520 | 520 | 38 |
| 10 | 530 | 1,500 | 510 | 40 |
| 15 | 500 | 1,550 | 510 | 40 |

Using the same rubber mill and the same technique as have been described, a vulcanizate having the following composition was prepared:

| | Parts |
|---|---|
| GR-S Black-1 | 150 |
| Zinc oxide | 5 |
| Softener | 5 |
| Sulfur | 2 |
| Zinc dimethyldithiocarbamate | 0.4 |

Another vulcanizate was prepared in the same manner, the accelerator being zinc dimethyldithiocarbamate 5% PB1100-e. The vulcanizates were of substantially the same quality, as can be seen from the original physical properties in Table 4.

Table 4.—Original properties

VULCANIZATE WITH ZINC DIMETHYLDITHIO-CARBAMATE

| Mins. cure @ 307° F. | Modulus, 300% | Tensile strength | Elongation | Hardness |
|---|---|---|---|---|
| 5 | 490 | 1,820 | 710 | 55 |
| 10 | 990 | 2,730 | 600 | 60 |
| 15 | 1,290 | 2,920 | 530 | 59 |
| 30 | 1,510 | 2,890 | 480 | 58 |

VULCANIZATE WITH ZINC DIMETHYLDITHIO-CARBAMATE 5% PB1100-e

| | | | | |
|---|---|---|---|---|
| 5 | 470 | 1,710 | 680 | 55 |
| 10 | 1,010 | 2,870 | 620 | 60 |
| 15 | 1,330 | 3,120 | 550 | 60 |
| 30 | 1,410 | 3,190 | 520 | 60 |

The mechanical stability of the polybutene treated accelerators of this invention is illustrated by the following. The particular accelerators employed in this severe test were in extruded form. The individual agglomerates were parallelopipeds about ⅛ inch on a side and varying in length between about ⅛ inch and ½ inch. Cylindrical fiber carbons having metal lids and bottoms, and each containing 100 pounds of accelerator were shipped by commercial motor freight from Wyandotte, Michigan, to Los Angeles, California, and return. The cartons were apparently loaded and reloaded many times during the course of shipment, for upon return to Wyandotte, Michigan, they were much the worse for wear and tear, but still sufficiently intact as to be non-leaking. Samples from each carton were tested to determine the amount of disintegration resulting from this very drastic handling. The results using a fairly coarse sieve, are shown in Table 5.

Table 5

| Accelerator | Percent Passing through 10 mesh sieve |
|---|---|
| Zinc dimethyldithiocarbamate 5% PB1100-e | 11.9 |
| Zinc diethyldithiocarbamate 5% PB1100-e | 6.0 |
| Zinc dibutyldithiocarbamate 5% PB1100-e | 12.0 |
| Selenium diethyldithiocarbamate 5% PB1100-e | 9.1 |

It is to be understood that the above particular description is by way of illustration, and not of limitation, and that changes, omissions, additions, substitutions, and/or modifications may be made within the scope of the claims without departing from the spirit of the invention. For example, my polybutene and/or hydrogenated polybutene treatment may be employed in combination or in conjunction with other treatments, whether for a similar purpose or otherwise. Thus, accelerators which were initially coated with mineral oil for non-dusting purposes were very successfully treated in accordance with this invention to produce both powders and agglomerates. It is of course to be understood that if desired for any reason, other treating agents may be combined with the treating agents of this invention for any desired purpose. Then, too, any of the various so-called antioxidants which are employed in the compounding of rubber and which are normally solid may be substituted, in whole or in part, for the solid accelerators to which the above particular description more particularly relates, to produce powders or agglomerates as desired, and which in turn are employed in rubber compounding. Examples of such solid antioxidants are: monobenzyl ether of hydroquinone; mixture of phenyl beta naphthylamine, p-isopropoxy diphenylamine and diphenyl p-phenylene diamine; mixture of phenyl beta naphthylamine; and diphenyl p-phenylenediamine; phenyl beta naphthylamine; N, N'-dibetanaphthyl p-phenylenediamine; condensation product of acetone and aniline; phenyl alpha naphthylamine; di-ortho-tolylguanidine salt of dicatechol borate; reaction product of acetone and para amino diphenyl; 50% phenyl-beta-naphthylamine, 25% di-para-methoxy-diphenylamine, 25% diphenyl p-phenylamine diamine; and bis-(2 - hydroxy - 3-tert. butyl-5-methyl phenyl)-methane.

Accordingly, it is intended that the patent shall cover by suitable expression in the claims whatever features of patentable novelty reside in the invention.

I claim:

1. A rubber accelerator product, comprising at least one normally solid rubber accelerator salt of N-disubstituted dithiocarbamic acid having applied thereto, in amount from 0.5% to 20% by weight based on accelerator, one of the group consisting of polybutene and hydrogenated polybutene; the average molecular weight of the applied material being between 500 and 5000.

2. A product of claim 1 in which said material applied is polybutene.

3. A product of claim 2 in which the polybutene has an average molecular weight between 750 and 3000 and the amount applied is between 1% and 10% based on accelerator.

4. A product of claim 3 in powder form.

5. A product of claim 3 in agglomerate form.

6. A product of claim 3 in which the accelerator is zinc dimethyldithiocarbamate.

7. A product of claim 3 in which the accelerator is zinc diethyldithiocarbamate.

8. A product of claim 3 in which the accelerator is zinc dibutyldithiocarbamate.

9. A product of claim 3 in which the accelerator is selenium diethyldithiocarbamate.

10. A product of claim 3 in which the accelerator is tellurium diethyldithiocarbamate.

JOHN F. OLIN.

References Cited in the file of this patent

UNITED STATES PATENTS

| Number | Name | Date |
|---|---|---|
| 2,343,835 | Smith et al. | Mar. 7, 1944 |
| 2,392,847 | Frolich | Jan. 15, 1946 |